United States Patent
Sakai

(10) Patent No.: US 8,134,986 B2
(45) Date of Patent: Mar. 13, 2012

(54) COMMUNICATION APPARATUS AND METHOD FOR CONTROLLING THE SAME

(75) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 975 days.

(21) Appl. No.: 12/119,186

(22) Filed: May 12, 2008

(65) Prior Publication Data

US 2008/0299909 A1  Dec. 4, 2008

(30) Foreign Application Priority Data

May 31, 2007  (JP) ................ 2007-145452

(51) Int. Cl.
*H04Q 7/24* (2006.01)
(52) U.S. Cl. ......... 370/338; 455/411; 455/418; 709/203
(58) Field of Classification Search ............ 455/411, 455/418, 422.1; 370/338, 350; 709/203, 709/229
See application file for complete search history.

(56) References Cited

U.S. PATENT DOCUMENTS

| 2006/0246946 A1 | 11/2006 | Moritomo et al. |
| 2006/0246947 A1 | 11/2006 | Fujii et al. |
| 2006/0268805 A1* | 11/2006 | Kawai et al. ......... 370/338 |

FOREIGN PATENT DOCUMENTS

| CN | 1855866 A | 11/2006 |
| JP | 2003-338821 A | 11/2003 |
| JP | 2006-311138 A | 11/2006 |

* cited by examiner

*Primary Examiner* — Phuoc Doan
(74) *Attorney, Agent, or Firm* — Canon, US.A., Inc. IP Division

(57) ABSTRACT

An apparatus includes a storage unit to store communication parameters and a configuration processing identifier allocated to the communication parameters and an acquisition unit to acquire a configuration processing identifier from another apparatus. The apparatus determines whether to use communication parameters stored in the storage unit or acquire communication parameters from other communication apparatus, based on the configuration processing identifier stored in the storage unit and the configuration processing identifier acquired by the acquisition unit.

16 Claims, 10 Drawing Sheets

FIG.3

| No. | CONFIGURATION PROCESSING IDENTIFIER | SSID | AUTHENTICATION METHOD | ENCRYPTION METHOD | ENCRYPTION KEY |
|---|---|---|---|---|---|
| 1 | AAAA | SSID-AAAA | OPEN | WEP | abcde |
| 2 | BBBB | SSID-BBBB | WPA | TKIP | abcdefghi |
| 3 | CCCC | SSID-CCCC | WPA | TKIP | ihgfedcba |

COMMUNICATION APPARATUS AND METHOD FOR CONTROLLING THE SAME

BACKGROUND OF THE INVENTION

1. Field of the Invention

The present invention relates to a communication apparatus having a communication parameter configuration function and a method for controlling the communication apparatus.

2. Description of the Related Art

The communication using IEEE 802.11 wireless local area networks requires configuring wireless communication parameters (hereinafter, referred to as "wireless parameters") such as communication channel, network identifier (Service Set Identifier (SSID)), encryption method, encryption key, authentication method, and authentication key, for each wireless communication apparatus.

In general, configuring these wireless parameters by manual input is a complicated work for a user. Therefore, as discussed in Japanese Patent Application Laid-Open No. 2003-338821 or U.S. Patent Application Publication No. 2006/0246947 (corresponding to Japanese Patent Application Laid-Open No. 2006-311138), there is a conventional method for automatically acquiring wireless parameters from various manufacturers and configuring the acquired wireless parameters to a wireless communication apparatus. According to such a conventional method, configuration of wireless parameters can be automatically performed according to a predetermined procedure and messages between connected wireless communication apparatuses, so that the wireless parameters can be supplied from one wireless communication apparatus to the other wireless communication apparatus.

Wi-Fi Protected Setup (WPS) is an automatic configuration method recently standardized by Wi-Fi Alliance.

In many cases, when a providing apparatus supplies wireless parameters to a reception apparatus according to an automatic configuration method, the providing apparatus performs encryption key exchange processing and wireless parameter encryption processing for the purpose of enhancing the security. In general, the encryption key exchange processing and the wireless parameter encryption processing require a long time. Therefore, the usability of a wireless communication apparatus deteriorates if a user is required to perform configuration of wireless parameters every time the user starts wireless communication.

If there are common wireless parameters available between two or more wireless communication apparatuses, it is useful to perform communication based on the common wireless parameters. However, even in such a case, the operability deteriorates if a user is required to determine whether to use wireless parameters already stored or newly perform wireless parameter configuration processing.

Moreover, if a providing apparatus supplies different wireless parameters to a plurality of reception apparatuses, these apparatuses may not be capable of performing wireless communication with each other.

The above-described problems are not limited to wireless parameters. Similar problems occur if wired communication apparatuses perform communication based on communication parameters.

SUMMARY OF THE INVENTION

Exemplary embodiments of the present invention are directed to a communication apparatus and a method for controlling the same.

According to an aspect of the present invention, an apparatus includes a storage unit configured to store communication parameters and a configuration processing identifier allocated to the communication parameters; an acquisition unit configured to acquire a configuration processing identifier from another apparatus; and a determination unit configured to determine whether to use the communication parameters stored in the storage unit or acquire communication parameters from the other communication apparatus based on the configuration processing identifier stored in the storage unit and the configuration processing identifier acquired by the acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 3 illustrates an example table that lists configuration processing identifiers according to a first exemplary embodiment of the present invention.

DETAILED DESCRIPTION OF THE EMBODIMENTS

Figure 1:
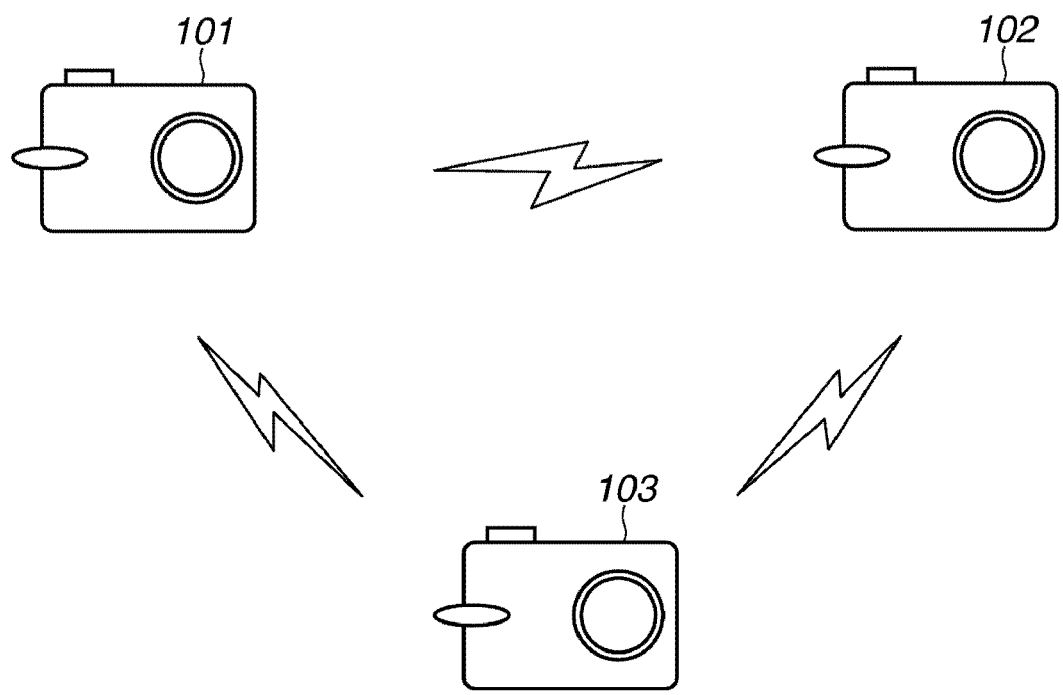
FIG. 1 illustrates an example network configuration according to an exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

First Exemplary Embodiment

FIG. 1 illustrates an example network configuration according to an exemplary embodiment of the present invention. The network illustrated in FIG. 1 includes three wireless communication apparatuses 101, 102, and 103. Each wireless communication apparatus has a communication function using IEEE 802.11-based wireless local area networks (hereinafter, referred to as "wireless LAN") and can perform wireless communication in an ad hoc mode. The ad hoc mode enables wireless communication apparatuses to directly perform wireless communication without using any Access Point (base station).

Each wireless communication apparatus has an automatic wireless parameter configuration function and starts automatic wireless parameter configuration processing if a user instructs the wireless communication apparatus to start wireless communication.

The wireless communication apparatus, after starting the automatic wireless parameter configuration processing, performs scan (search) processing for determining whether there is any providing apparatus that can provide wireless parameters (hereinafter, simply referred to as "providing apparatus"). If the scan processing cannot find any providing apparatus in an enabled communication area, the wireless communication apparatus determines its role as a providing apparatus. If any providing apparatus is present in the enabled communication area, the wireless communication apparatus determines its role as a parameter reception apparatus (hereinafter, "reception apparatus"). Then, the configuration of wireless parameters is performed between a determined providing apparatus and a reception apparatus.

Figure 2:
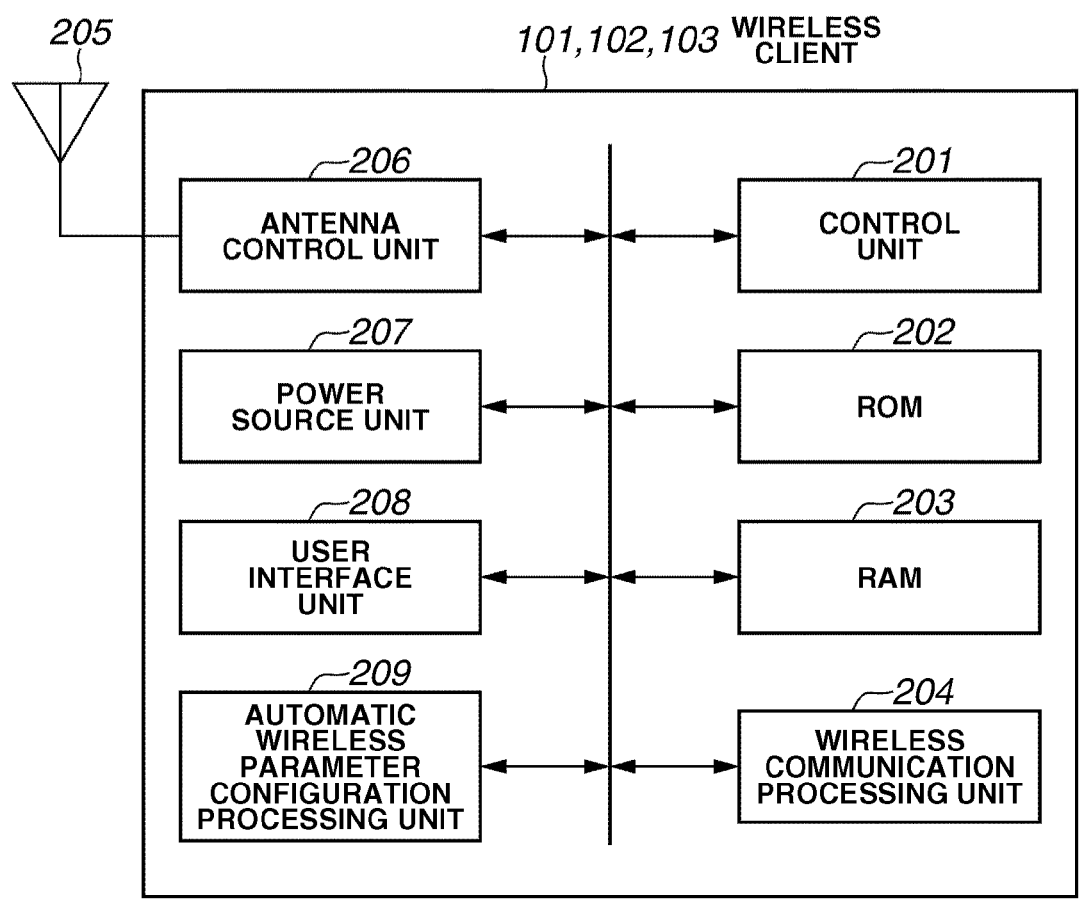
FIG. 2 is a block diagram illustrating an example wireless communication apparatus according to an exemplary embodiment of the present invention.

FIG. 2 is a block diagram illustrating an example configuration of the wireless communication apparatus 101 (102, or 103). A control unit 201 controls operations performed by the wireless communication apparatus. A read-only memory (ROM) 202 stores computer program(s). The control unit 201 (central processing unit (CPU) (not illustrated)) can execute various processing according to the computer program(s) stored in the ROM 202. A random access memory (RAM) 203 stores variables and data which are temporarily used. The RAM 203 stores wireless parameters and a configuration processing identifier table. The RAM 203 includes an area storing wireless parameters used in the wireless communication. In the following description, "configuration of wireless parameters" is storing wireless parameters into the above-described area secured in the RAM 203.

More specifically, if a specific wireless parameter is stored in the RAM 203 and is not presently used for wireless communication (namely, not stored in the above-described area), this wireless parameter is regarded as a parameter "not yet configured as wireless parameter." A wireless communication processing unit 204 performs a wireless LAN communication control. Furthermore, the wireless communication apparatus includes an antenna 205, an antenna control unit 206, a power source unit 207, a user interface unit 208, and an automatic wireless parameter configuration processing unit 209. The user interface unit 208 enables a user to instruct the wireless communication apparatus to start wireless communication. The automatic wireless parameter configuration processing unit 209 performs wireless parameter configuration processing.

The block configuration illustrated in FIG. 2 is an example and can be replaced with other configuration.

FIG. 3 illustrates an example table stored in the RAM 203 of each wireless communication apparatus that lists configuration processing identifiers. The configuration processing identifier table registers unique configuration processing identifiers for a plurality of wireless parameters. The configuration processing identifier table illustrated in FIG. 3 stores network identifier (SSID), authentication method, encryption method, and encryption key, as wireless parameters.

The configuration processing identifier is an identifier that a providing apparatus can allocate to wireless parameters transmitted to a reception apparatus. The configuration processing identifier is, for example, Universally Unique Identifier (UUID), Media Access Control (MAC) address, and time information which can be unequivocally allocated to each wireless parameter.

After a providing apparatus has transmitted wireless parameters to a reception apparatus, the providing apparatus notifies the reception apparatus of a unique configuration processing identifier corresponding to the transmitted wireless parameters. If a providing apparatus transmits the same wireless parameters to a plurality of reception apparatuses, the providing apparatus notifies the same configuration processing identifier to each reception apparatus.

The providing apparatus registers wireless parameters transmitted to the reception apparatus and the corresponding configuration processing identifier notified to the reception apparatus in its configuration processing identifier table while associating them with each other. The reception apparatus registers the wireless parameters received from the providing apparatus and the corresponding configuration processing identifier notified from the providing apparatus in its configuration processing identifier table while associating them with each other.

Alternatively, each wireless communication apparatus can store wireless parameters and a corresponding configuration processing identifier beforehand. For example, wireless communication apparatuses of the same manufacturer can store common wireless parameters and a common configuration processing identifier beforehand.

An appropriate maximum value can be set if a plurality of configuration processing identifiers are registered in the configuration processing identifier table. If the total number of configuration processing identifiers to be registered exceeds the maximum value, the oldest configuration processing identifier and relating wireless parameters are automatically deleted from the configuration processing identifier table. Furthermore, a user can select and delete any configuration processing identifier and corresponding wireless parameters from the configuration processing identifier table.

Figure 4:
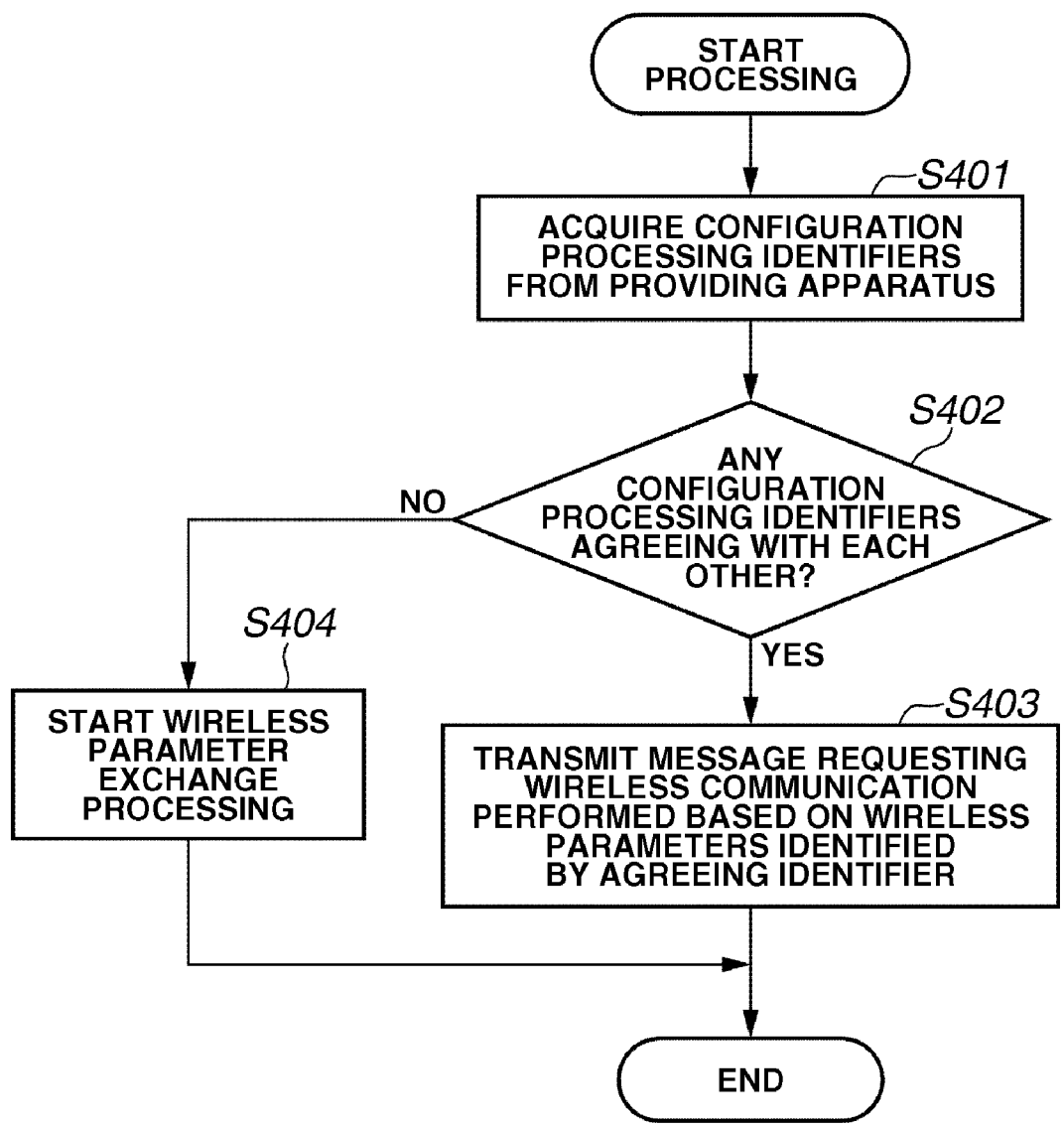
FIG. 4 is a flowchart illustrating example processing performed by a wireless communication apparatus when the role of the communication apparatus itself is determined as a reception apparatus.

FIG. 4 is a flowchart illustrating example processing performed by a wireless communication apparatus when the role of the communication apparatus itself is determined as a reception apparatus.

In step S401, the reception apparatus acquires configuration processing identifier(s) stored in the providing apparatus. More specifically, the reception apparatus transmits a request message to the providing apparatus that requests transmission of configuration processing identifier(s). Then, the reception apparatus receives a response message from the providing apparatus that includes configuration processing identifier(s) stored in the providing apparatus.

In step S402, the reception apparatus compares the configuration processing identifier(s) acquired in step S401 with configuration processing identifier(s) stored in its configuration processing identifier table. If there is any configuration processing identifier agreeing with each other (YES in Step S402), the processing proceeds to step S403. If there is not any agreeing configuration processing identifier (NO in Step S402), the processing proceeds to step S404.

In step S403, the reception apparatus transmits a request message to the providing apparatus to perform wireless communication based on wireless parameters identified by the agreeing configuration processing identifier. The reception apparatus transmits a request message including designation of the configuration processing identifier.

If there are two or more agreeing configuration processing identifiers, the reception apparatus designates a configuration processing identifier having the highest security level and transmits a request message to the providing apparatus to perform wireless communication based on wireless parameters identified by the configuration processing identifier having the highest-security level. In such a case, the reception apparatus transmits a request message including designation of a configuration processing identifier corresponding to the wireless parameters having the highest security level. In this manner, if there are many wireless parameters commonly used, the reception apparatus can perform wireless communication based on the wireless parameters having the highest security level.

In step S404, the reception apparatus performs wireless parameter exchange processing with the providing apparatus according to a predetermined procedure defined by an automatic wireless parameter configuration function and using appropriate messages. The wireless parameter exchange processing enables the reception apparatus to acquire wireless parameters from the providing apparatus.

To this end, an example method includes temporarily forming a network for configuring wireless parameters and enabling the wireless communication apparatuses to transmit/receive wireless parameters actually used in the wireless communication via the formed network.

As described above, the reception apparatus is configured to refer to configuration processing identifier(s) transmitted from the providing apparatus and appropriately determine whether to acquire wireless parameters from the providing apparatus (i.e., executes the wireless parameter exchange processing) or use wireless parameters stored in its memory.

Figure 5:
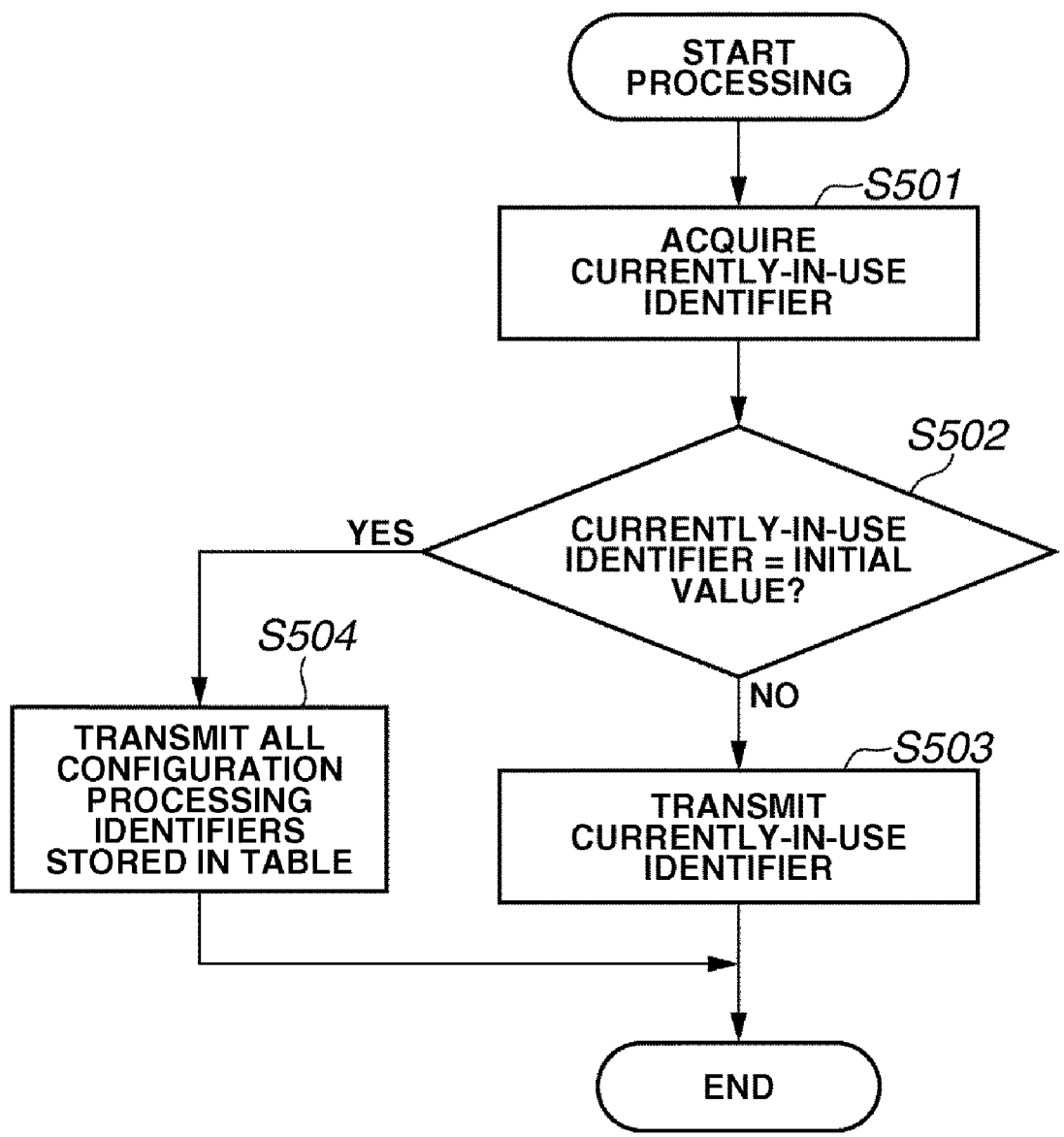
FIG. 5 is a flowchart illustrating example processing performed by a providing apparatus in response to a message of a reception apparatus that requests configuration processing identifier(s).

FIG. 5 is a flowchart illustrating example processing performed by the providing apparatus in response to a message from the reception apparatus that requests configuration processing identifier(s).

In step S501, the providing apparatus acquires a currently-in-use identifier from the RAM 203. In this embodiment, the currently-in-use identifier represents a configuration processing identifier allocated to the wireless parameters currently used in wireless communication.

If any wireless parameters are configured to start wireless communication between the providing apparatus and a reception apparatus, the providing apparatus records a configuration processing identifier corresponding to the wireless parameters as currently-in-use identifier to the RAM 203.

The currently-in-use identifier can be initialized upon starting the automatic wireless parameter configuration processing and set to a predetermined initial value. Accordingly, if the currently-in-use identifier acquired from the RAM 203 in step S501 is different from the initial value, the providing apparatus determines that common wireless parameters have been already configured for wireless communication performed with other reception apparatus. If the currently-in-use identifier is identical to the initial value, the providing apparatus determines that there is not any common wireless parameter configured for wireless communication performed with other wireless communication apparatus.

In step S502, the providing apparatus confirms a value of the currently-in-use identifier acquired in step S501. If the confirmed value of the currently-in-use identifier is different from the initial value (NO in step S502), the processing proceeds to step S503. If the currently-in-use identifier value is identical to the initial value (YES in step S502), the processing proceeds to step S504.

In step S503, the providing apparatus transmits the currently-in-use identifier acquired in step S501 to the reception apparatus. Namely, the providing apparatus transmits the configuration processing identifier corresponding to the presently configured wireless parameters, which is selected from the configuration processing identifiers stored in the configuration processing identifier table.

In step S504, the providing apparatus transmits all of the configuration processing identifiers stored in the configuration processing identifier table to the reception apparatus.

In this manner, if there are common wireless parameters already configured for wireless communication performed with other wireless communication apparatus, the providing apparatus transmits the configuration processing identifier corresponding to the already configured wireless parameters. If such common wireless parameters are not yet configured, the providing apparatus transmits all of the stored configuration processing identifiers.

Figure 6:
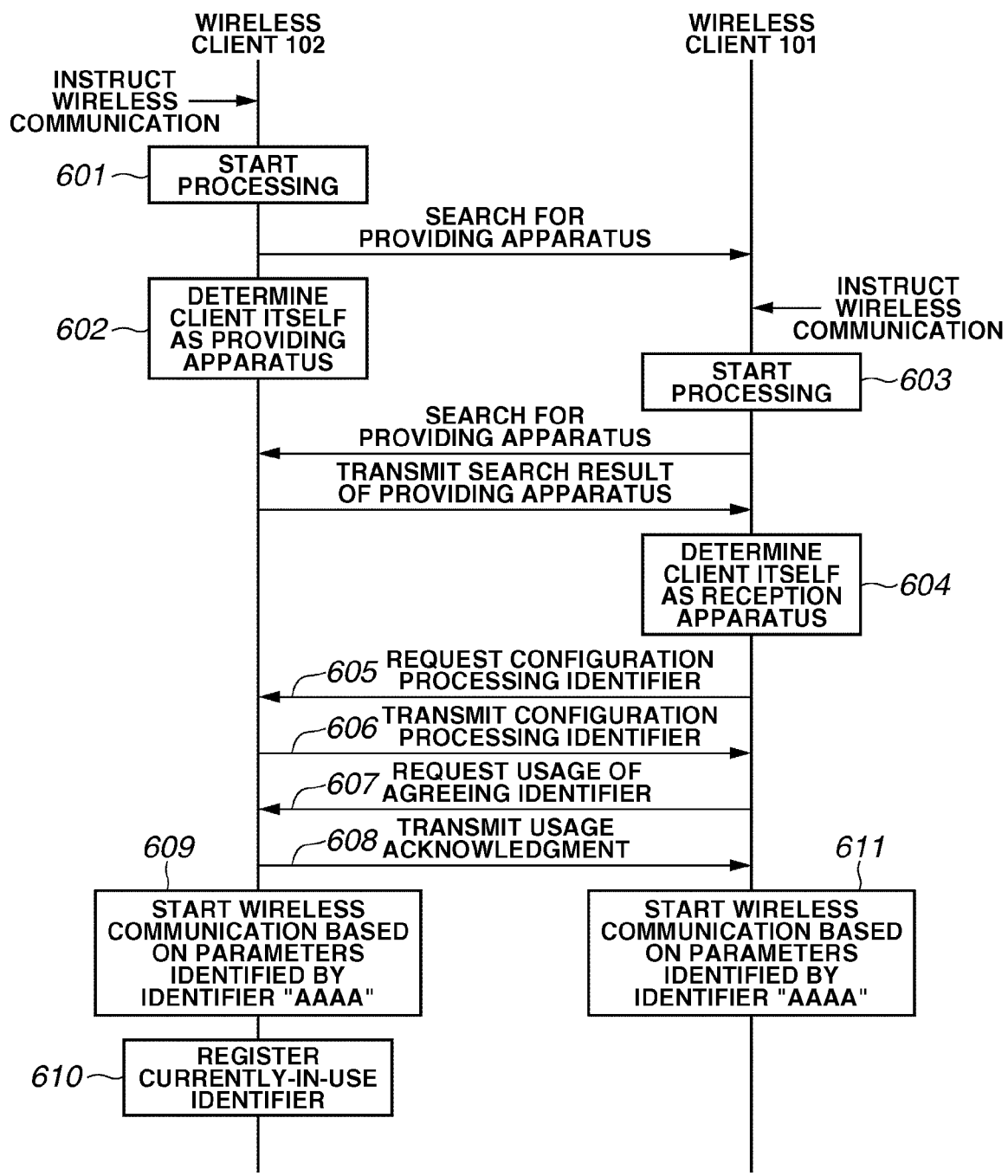
FIG. 6 illustrates an example sequence of automatic wireless parameter configuration processing according to the first exemplary embodiment of the present invention.

FIG. 6 illustrates an example sequence of automatic wireless parameter configuration processing performed between the wireless communication apparatus 101 and the wireless communication apparatus 102.

It is now assumed that a configuration processing identifier AAAA is allocated to wireless parameters stored in the wireless communication apparatus 101. The configuration processing identifier AAAA is also allocated to some of wireless parameters stored in the wireless communication apparatus 102. A configuration processing identifier BBBB is allocated to other wireless parameters stored in the wireless communication apparatus 102. The wireless communication apparatus 101 has not yet performed the automatic wireless parameter configuration processing with any other wireless communication apparatus.

First, if a user of the wireless communication apparatus 102 instructs via the user interface unit 208 to start wireless communication, the wireless communication apparatus 102 starts automatic wireless parameter configuration processing (601).

The wireless communication apparatus 102 performs scan processing for determining whether any providing apparatus is present in its enabled communication area. For example, an example scan method includes transmitting a search request (Probe Request) regulated for wireless LAN and performing active scan for monitoring a response (Probe Response) responding to the search request.

The wireless communication apparatus waits for a search response until a predetermined time has elapsed after transmitting the search request. A wireless communication apparatus having received a search request returns a search response including information indicating whether the communication apparatus itself is a providing apparatus or a reception apparatus. In an exemplary embodiment, the search response includes a storage area for a flag indicating the capability of providing wireless parameters. The flag is set to 1 when the wireless communication apparatus is a providing apparatus and is set to 0 when the wireless communication apparatus is not a providing apparatus. If the wireless communication apparatus receives a search response within the above-described predetermined time, the wireless communication apparatus can determine whether any providing apparatus is present or can identify a providing apparatus based on the received information.

The wireless communication apparatus having received a search request can return a search response if the communication apparatus itself is determined as a providing apparatus and does not return a search response if the communication apparatus itself is not determined as a providing apparatus. In such a case, if the wireless communication apparatus receives a search response within a predetermined time after transmitting a search request, the wireless communication apparatus determines that a transmission source of the search response is a providing apparatus. If the wireless communication apparatus does not receive any search response within the predetermined time, the wireless communication apparatus determines that there is no providing apparatus.

Another scan method includes performing passive scan for monitoring an informative signal (Beacon) returning from other wireless communication apparatus.

In an embodiment, if no providing apparatus is detected in the enabled communication area, the wireless communication apparatus 102 determines that its role is a providing apparatus (602).

Next, a user of the wireless communication apparatus 101 instructs via the user interface unit 208 to start wireless communication, and the wireless communication apparatus 101 starts automatic wireless parameter configuration processing (603).

The wireless communication apparatus 101 performs scan processing for determining whether any providing apparatus is present in its enabled communication area. As a result of scan processing, the wireless communication apparatus 101 detects the wireless communication apparatus 102 (the providing apparatus) and determines that the communication apparatus 101 itself is a reception apparatus (604).

The wireless communication apparatus 101, after determining its role as a reception apparatus, performs the processing described with reference to FIG. 4.

First, the wireless communication apparatus 101 transmits a message requesting configuration processing identifier(s) to the wireless communication apparatus 102 which serves as a providing apparatus (605; step S401).

The wireless communication apparatus 102 performs the processing described with reference to FIG. 5 in response to a message requesting configuration processing identifier(s).

In this embodiment, the wireless communication apparatus 102 has not yet performed automatic wireless parameter configuration processing with other wireless communication apparatus. Therefore, the currently-in-use identifier acquired from the RAM 203 has a value identical to the initial value (step S501, and YES in step S502). Accordingly, the wireless communication apparatus 102 transmits all of the configuration processing identifiers stored in its configuration processing identifier table to the wireless communication apparatus 101 (606; step S504).

The wireless communication apparatus 101 compares the configuration processing identifier(s) received from the wireless communication apparatus 102 with the configuration processing identifier(s) stored in its configuration processing identifier table (step S402). In this case, both the wireless communication apparatus 101 and the wireless communication apparatus 102 store the same configuration processing identifier AAAA in their tables. Therefore, the wireless communication apparatus 101 transmits a message requesting wireless communication performed based on wireless parameters identified by the configuration processing identifier AAAA to the wireless communication apparatus 102 (607; step S403).

In response to the request message received from the wireless communication apparatus 101, the wireless communication apparatus 102 transmits an acknowledgment to the wireless communication apparatus 101 (608). Then, the wireless communication apparatus 102 configures wireless parameters identified by the configuration processing identifier AAAA and starts wireless communication based on the configured wireless parameters (609).

Furthermore, the wireless communication apparatus 102 registers the configuration processing identifier AAAA allocated to the wireless parameters used in the current wireless communication as a currently-in-use identifier in the RAM 203 (610).

In response to the acknowledgment received from the wireless communication apparatus 102, the wireless communication apparatus 101 configures wireless parameters identified by the configuration processing identifier AAAA and starts wireless communication based on the configured wireless parameters (611).

Through the above-described procedure, the wireless communication apparatus 101 and the wireless communication apparatus 102 can accomplish the automatic wireless parameter configuration processing.

In this manner, if the automatic wireless parameter configuration processing is started between two wireless communication apparatuses that store common wireless parameters beforehand, an exemplary embodiment configures the common wireless parameters and starts wireless communication. Accordingly, an exemplary embodiment does not require newly transmitting/receiving another wireless parameters and can reduce the time required for the configuration processing and improve the operability.

Figure 7:
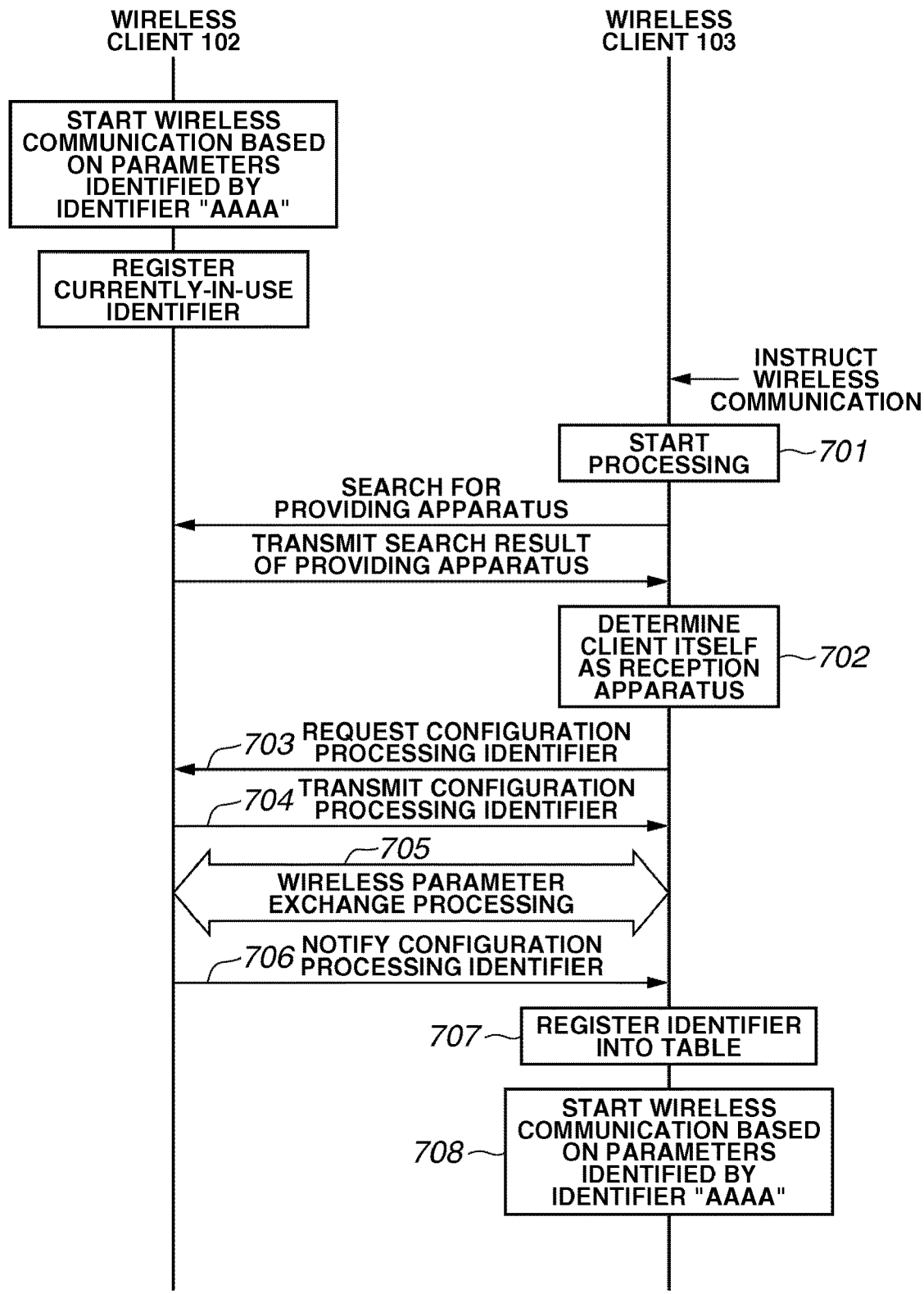
FIG. 7 illustrates an example sequence of automatic wireless parameter configuration processing according to the first exemplary embodiment of the present invention.

FIG. 7 illustrates an example sequence of the automatic wireless parameter configuration processing performed between the wireless communication apparatus 102 and the wireless communication apparatus 103 after completing the sequence illustrated in FIG. 6.

It is now assumed that the wireless communication apparatus 103 stores wireless parameters identified by the configuration processing identifier BBBB beforehand. Namely, the wireless communication apparatus 103 and the wireless communication apparatus 102 (the providing apparatus) store common wireless parameters.

First, if a user of the wireless communication apparatus 103 instructs via the user interface unit 208 to start wireless communication, the wireless communication apparatus 103 starts automatic wireless parameter configuration processing (701).

The wireless communication apparatus 103 performs scan processing for determining whether any providing apparatus is present in its enabled communication area. As a result of scanning processing, the wireless communication apparatus 103 detects the wireless communication apparatus 102 (the providing apparatus) and determines the communication apparatus 103 itself as a reception apparatus (702).

The wireless communication apparatus 103, after determining the role of the communication apparatus 103 itself as a reception apparatus, performs the processing described with reference to FIG. 4.

First, the wireless communication apparatus 103 transmits a message requesting configuration processing identifier(s) to the wireless communication apparatus 102 (the providing apparatus) (703).

In response to the message requesting configuration processing identifier(s), the wireless communication apparatus 102 performs the processing described in FIG. 5.

In this embodiment, the wireless communication apparatus 102 and the wireless communication apparatus 101 have already completed the wireless parameter configuration processing. The currently-in-use identifier acquired from the RAM 203 is AAAA (step S501). Accordingly, the currently-in-use identifier is different from the initial value (NO in step S502), the wireless communication apparatus 102 transmits the currently-in-use identifier AAAA to the wireless communication apparatus 103 (704; step S503).

The wireless communication apparatus 103 compares the configuration processing identifier received from the wireless communication apparatus 102 with the configuration processing identifiers stored in the configuration processing identifier table of the communication apparatus 103 itself (step S402). In this embodiment, the received configuration processing identifier (currently-in-use identifier AAAA) disagrees with the configuration processing identifier BBBB stored in the wireless communication apparatus 103. Therefore, the wireless communication apparatus 103 and the wireless communication apparatus 102 perform wireless parameter exchange processing with each other (705; step S404). In the wireless parameter exchange processing, the wireless communication apparatus 102 transmits wireless parameters identified by the configuration processing identifier AAAA to the wireless communication apparatus 103.

The wireless communication apparatus 102, after completing transmission of the wireless parameters to the wireless communication apparatus 103, notifies the wireless communication apparatus 103 of the configuration processing identifier AAAA (706). As the wireless communication apparatus 102 has already notified the wireless communication apparatus 103 of the configuration processing identifier AAAA in step 704, the wireless communication apparatus 102 can skip the processing of step 706.

The wireless communication apparatus 103 registers the configuration processing identifier AAAA and the wireless parameters transmitted from the wireless communication apparatus 102 into its configuration processing identifier table while associating them with each other (707), and starts wireless communication based on the registered wireless parameters (708).

Through the above-described procedure, the wireless communication apparatus 102 and the wireless communication apparatus 103 can accomplish the automatic wireless parameter configuration processing.

In the above-described exemplary embodiment, the providing apparatus notifies the reception apparatus of a corresponding configuration processing identifier after transmitting wireless parameters to the reception apparatus through the wireless parameter exchange processing. It is also useful that the providing apparatus transmits a configuration processing identifier together with the wireless parameters to the reception apparatus.

As described above, if the automatic wireless parameter configuration processing is newly performed between the wireless communication apparatus 102 and the wireless communication apparatus 103 after the wireless communication apparatus 102 completes transmission of wireless parameters to the wireless communication apparatus 101, the wireless communication apparatus 102 transmits wireless parameters identical to those having been supplied to the wireless communication apparatus 101 to the wireless communication apparatus 103. Accordingly, even if common wireless parameters are already configured between the wireless communication apparatus 102 and the wireless communication apparatus 103, these common wireless parameters are disregarded. Therefore, an exemplary embodiment can maintain the wireless communication already started between the wireless communication apparatus 102 and the wireless communication apparatus 101, while newly starting wireless communication between the wireless communication apparatus 102 and the wireless communication apparatus 103. In this manner, even if three or more wireless communication apparatuses belonging to the same network perform wireless communication, the providing apparatus can configure common wireless parameters for all of connected reception apparatuses.

As described above, according to the above-described exemplary embodiment, the reception apparatus refers to a received configuration processing identifier and can appropriately determine whether to acquire wireless parameters from a providing apparatus through the wireless parameter exchange processing or use the wireless parameters already stored.

Second Exemplary Embodiment

According to the above-described first exemplary embodiment, after completing the wireless parameter exchange processing, the providing apparatus notifies the reception apparatus of a configuration processing identifier.

For example, after numerous wireless communication apparatuses have performed wireless communication based on common wireless parameters, two of the wireless communication apparatuses may newly start wireless communication. In such cases, the reuse of wireless parameters is not preferred in view of security.

Hence, according to the second exemplary embodiment, the providing apparatus determines whether to notify the reception apparatus of a configuration processing identifier. In the second exemplary embodiment, the configuration of a network and the block configuration of each wireless communication apparatus are not different from those described in the first exemplary embodiment and therefore not described below.

In this embodiment, the providing apparatus determines whether to transmit a configuration processing identifier prior to the wireless parameter exchange processing performed between the providing apparatus and the reception apparatus.

Figure 8:
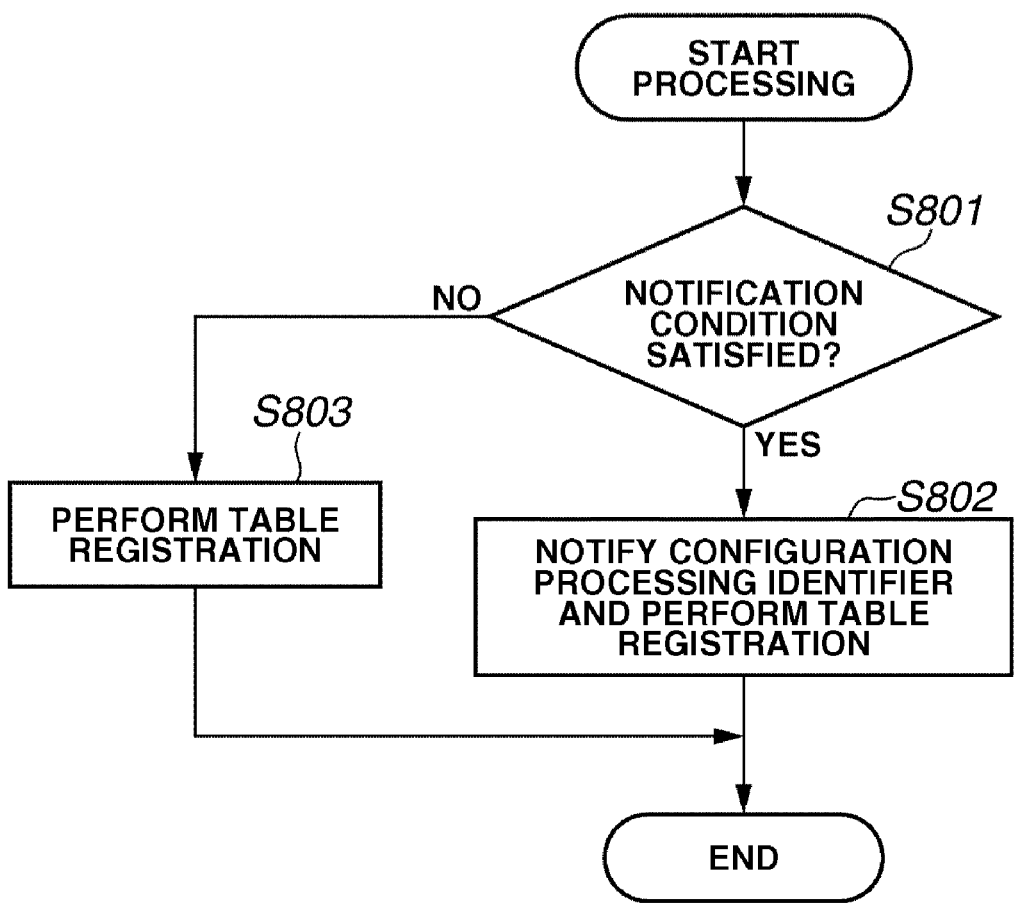
FIG. 8 is a flowchart illustrating example processing performed by a providing apparatus to determine whether to transmit a configuration processing identifier according to a second exemplary embodiment of the present invention.

FIG. 8 illustrates example processing performed by the providing apparatus to determine whether to notify a configuration processing identifier to the reception apparatus.

In step S801, the providing apparatus determines whether predetermined condition(s) is satisfied for notifying a configuration processing identifier. If the providing apparatus determines that the notification condition(s) is satisfied (YES in step S801), the processing proceeds to step S802. If the notification condition(s) is not satisfied (NO in step S801), the processing proceeds to step S803.

An example condition for allowing notification of a configuration processing identifier is whether the reception apparatus has device information that agrees with predetermined information. The device information of a reception apparatus is information indicating features of the reception apparatus (e.g., product name, vendor name, device type, serial number, UUID, MAC address).

The device information is, for example, involved in a scan request for searching a providing apparatus or in a request for acquiring configuration processing identifier(s). The providing apparatus stores the acquired device information into the RAM 203.

In step S801, if the notification condition is "vendor name=company A" and a vendor name of the reception apparatus is "company A", the providing apparatus determines that the notification condition is satisfied.

In step S802, similar to the first exemplary embodiment, the providing apparatus notifies the reception apparatus of the configuration processing identifier and registers the configuration processing identifier and wireless parameters into its configuration processing identifier table.

In step S803, the providing apparatus does not transmit any configuration processing identifier to the reception apparatus and registers the configuration processing identifier and wireless parameters into its configuration processing identifier table.

Through the above-described procedure, an exemplary embodiment completes the processing for determining whether to notify (transmit) a configuration processing identifier.

In another exemplary embodiment, the notification condition is whether the security level of wireless parameters transmitted to the reception apparatus is higher than a predetermined security level.

Furthermore, in another exemplary embodiment, the notification condition is whether an item selected via the user interface unit 208 agrees with a predetermined item when the automatic wireless parameter configuration processing is started. For example, if the user interface unit 208 displays menu items on its screen and enables a user to select between "perform wireless communication with a plurality of communication apparatuses" and "perform one-to-one wireless communication", the providing apparatus transmits a configuration processing identifier to the reception apparatus for configuration of wireless parameters only when the user selects the latter item.

When the providing apparatus transmits wireless parameters to the reception apparatus, the providing apparatus can notify the reception apparatus of a corresponding configuration processing identifier. In this case, the providing apparatus can perform the above-described determination for transmitting a configuration processing identifier at the timing the providing apparatus transmits the wireless parameters.

If the above-described notification condition is not satisfied, it is useful not to configure the wireless parameters corresponding to the already transmitted configuration processing identifier as a response to a configuration processing identifier request received from the reception apparatus. For example, if the providing apparatus performs wireless parameter exchange processing after completing transmission of the configuration processing identifier AAAA stored beforehand to the reception apparatus, it is useful to configure wireless parameters other than the wireless parameters identified by the configuration processing identifier AAAA. In this case, the reception apparatus cannot predict a configuration processing identifier corresponding to the configured wireless parameters. Thus, the security can be enhanced.

As described above, an exemplary embodiment can prevent the providing apparatus from transmitting a configuration processing identifier to the reception apparatus if it is not desired that the wireless parameters are commonly used between the providing apparatus and the reception apparatus. Therefore, an exemplary embodiment can enhance the security level.

Third Exemplary Embodiment

According to the above-described first exemplary embodiment, the wireless communication apparatus 102 and the wireless communication apparatus 101 store the same configuration processing identifier AAAA beforehand. And, the wireless communication apparatus 102 and the wireless communication apparatus 103 store the same configuration processing identifier BBBB beforehand.

In an example case, the wireless communication apparatus 102 and other wireless communication apparatus do not store the same configuration processing identifier. The wireless communication apparatuses 101 and 103 store the same configuration processing identifier. For example, the wireless communication apparatus 102 stores the configuration processing identifier AAAA beforehand. The wireless communication apparatuses 101 and 103 store the same configuration processing identifier BBBB.

In this case, if the wireless communication apparatus 101 (or 103) operates as a providing apparatus, the wireless communication apparatuses 101 and 103 can perform wireless communication based on common wireless parameters stored beforehand. The wireless communication apparatus 101 (or 103) performs wireless parameter exchange processing only when the wireless communication apparatus 101 (or 103) communicates with the wireless communication apparatus 102.

On the other hand, if the wireless communication apparatus 102 operates as a providing apparatus, the wireless communication apparatuses 101 and 103 are required to perform wireless parameter exchange processing that requires a relatively long processing time.

Hence, the third exemplary embodiment differs from the above-described first and second exemplary embodiments in that a wireless communication apparatus can determine its role based on configuration processing identifier(s) stored in peripheral wireless communication apparatuses.

In this embodiment, a search request for scanning a providing apparatus can be used as a message requesting configuration processing identifier(s). Namely, if each wireless communication apparatus receives a search request, the wireless communication apparatus transmits a search response including information indicating whether the communication apparatus itself is a providing apparatus as well as configuration processing identifier(s) stored in its table. The wireless communication apparatus having received the search response refers to the received information and stores the information indicating whether the transmission source is a providing apparatus and the configuration processing identifier(s) stored in the transmission source into the RAM 203.

Figure 10:
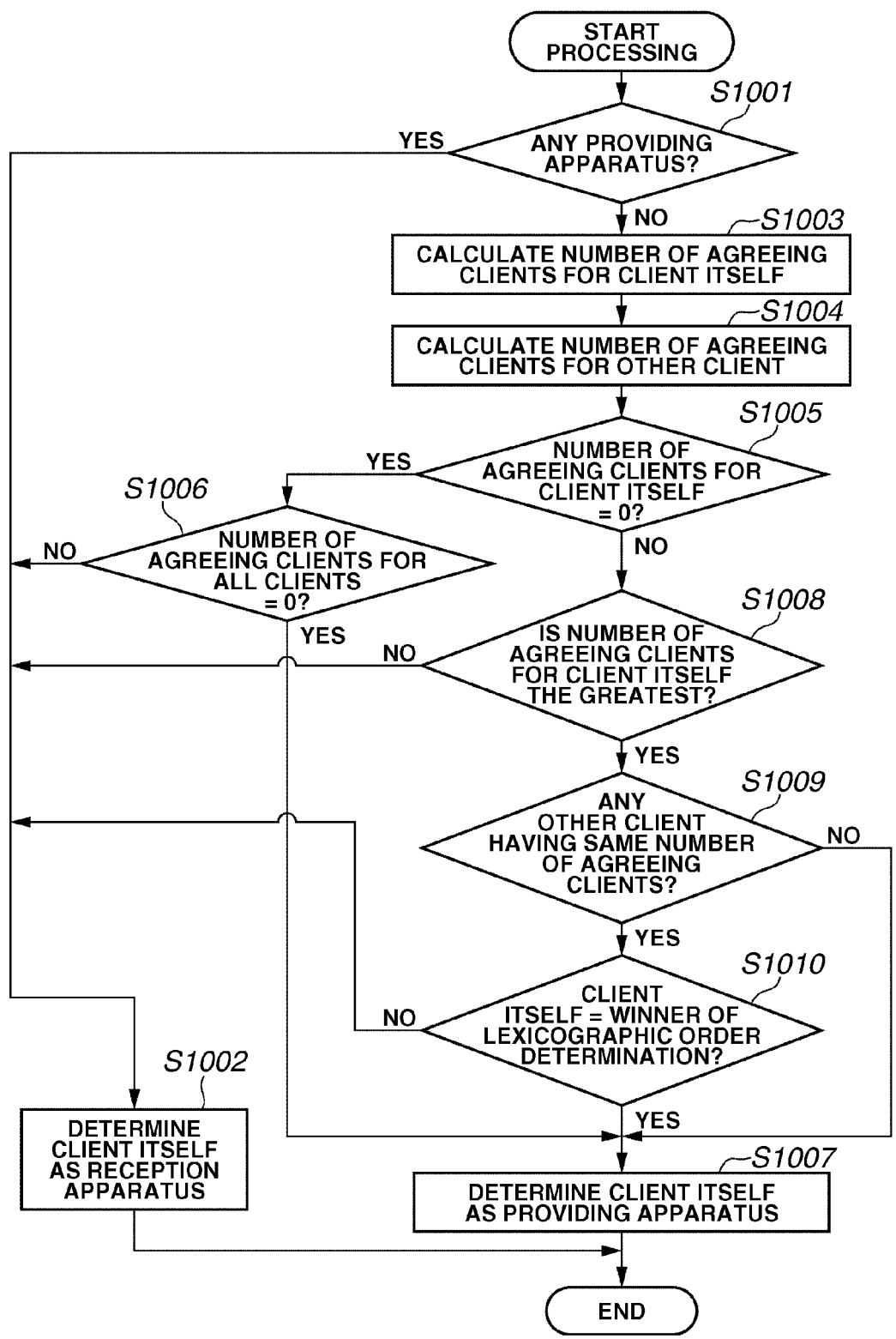
FIG. 10 is a flowchart illustrating example processing for determining the role of a wireless communication apparatus according to the third exemplary embodiment of the present invention.

FIG. 10 is a flowchart illustrating example processing for determining the role of a wireless communication apparatus according to the third exemplary embodiment of the present invention.

The role determination processing automatically starts in response to expiration of timer T which is activated upon starting the automatic wireless parameter configuration processing.

In step S1001, the wireless communication apparatus determines whether there is any providing apparatus existing in its enabled communication area based on a result of scan processing. If a providing apparatus is present in the enabled communication area (YES in step S1001), the processing proceeds to step S1002. On the other hand, if there is not any available providing apparatus in the communication area (NO in step S1001), the processing proceeds to step S1003.

In step S1002, the wireless communication apparatus determines its role as a reception apparatus.

In step S1003, the wireless communication apparatus calculates the number of wireless communication apparatuses having any configuration processing identifier that agrees with the configuration processing identifier(s) stored in the communication apparatus itself and records the calculated number as "number of agreeing apparatuses" into the RAM 203.

For example, if three wireless communication apparatuses including the communication apparatus itself store the same configuration processing identifier, the wireless communication apparatus records "3" as the number of agreeing apparatuses. If there is not any agreeing configuration processing identifier, the wireless communication apparatus records "0" as the number of agreeing apparatuses.

If there are a plurality of agreeing configuration processing identifiers, the wireless communication apparatus calculates the number of agreeing apparatuses for each configuration processing identifier and records the maximum number of agreeing apparatuses into the RAM 203.

After completing the recording of the number of agreeing apparatuses into the RAM 203, the processing proceeds to step S1004.

In step S1004, the wireless communication apparatus calculates the number of agreeing apparatuses (step S1003) for each wireless communication apparatus, i.e., a transmission source of a configuration processing identifier (transmission source of a search response)

After completing the calculation of the number of agreeing apparatuses for all wireless communication apparatuses (transmission sources of a configuration processing identifier), the processing proceeds to step S1005.

In step S1005, the wireless communication apparatus determines whether the number of agreeing apparatuses of the communication apparatus itself is 0. If the number of agreeing apparatuses is 0 (YES in step S1005), the processing proceeds to step S1006. If the number of agreeing apparatuses is not 0 (NO in step S1005), the processing proceeds to step S1008.

In step S1006, the wireless communication apparatus determines whether the number of agreeing apparatuses of all wireless communication apparatuses is 0. If the numbers of agreeing apparatuses of all wireless communication apparatuses are 0 (YES in step S1006), the processing proceeds to step S1007. In step S1007, the wireless communication apparatus determines its role as a providing apparatus. If any one of the numbers of agreeing apparatuses is not 0 (NO in step S1006), the processing proceeds to step S1002. In step S1002, the wireless communication apparatus determines its role as a reception apparatus. In this manner, if no wireless communication apparatuses can use common wireless parameters, the wireless communication apparatus itself operates as a providing apparatus. Furthermore, even if the wireless communication apparatus does not store any common wireless parameters, the wireless communication apparatus operates as a reception apparatus if there are any common wireless parameters available between other wireless communication apparatuses.

In step S1008, the wireless communication apparatus compares the numbers of agreeing apparatuses of respective wireless communication apparatuses stored in the RAM 203 and determines whether the number of agreeing apparatuses of the communication apparatus itself is largest.

If the number of agreeing apparatuses of the communication apparatus itself is largest (YES in step S1008), the processing proceeds to step S1009. If there is any other wireless communication apparatus having a number of agreeing apparatuses larger than the number of agreeing apparatuses of the communication apparatus itself (NO in step S1008), the processing proceeds to step S1002. In step S1002, the wireless communication apparatus determines its role as a reception apparatus. In this manner, if there is any other wireless communication apparatus storing more wireless parameters than the communication apparatus itself, the wireless communication apparatus operates as a reception apparatus.

In step S1009, the wireless communication apparatus determines whether there is any wireless communication apparatus having a number of agreeing apparatuses identical to the number of agreeing apparatuses of the communication apparatus itself.

If there is not any other wireless communication apparatus having a number of agreeing apparatuses identical to the number of agreeing apparatuses of the communication apparatus itself (NO in step S1009), namely if the communication apparatus itself stores a greatest number of wireless parameters compared to those of other wireless communication apparatuses, the processing proceeds to step S1007. In step S1007, the wireless communication apparatus determines its role as a providing apparatus. If there is other wireless communication apparatus having a number of agreeing apparatuses identical to the number of agreeing apparatuses of the communication apparatus itself (YES in step S1009), the processing proceeds to step S1010.

In step S1010, the wireless communication apparatus performs lexicographic order determination based on the device identification information between the communication apparatus itself and the wireless communication apparatus having the same number of agreeing apparatuses When the wireless communication apparatus performs the above-described determination, any information available for identifying each wireless communication apparatus (UUID, MAC address, etc.) can be used as the device identification information. The search response returned from each wireless communication apparatus includes UUID, and MAC address.

The wireless communication apparatus compares UUIDs of respective wireless communication apparatuses according to the lexicographic order. If the communication apparatus itself is a winner in the lexicographic order determination (YES in step S1010), the processing proceeds to step S1007. In step S1007, the wireless communication apparatus determines its role as a providing apparatus. If the communication apparatus itself is a loser in the lexicographic order determination (NO in step S1010), the processing proceeds to step S1002. In step S1002, the wireless communication apparatus determines its role as a reception apparatus. In this manner, if the communication apparatus itself and other wireless communication apparatus(s) are not different with respect to the greatest number of agreeing apparatuses, the wireless communication apparatus can determine whether to operate as a providing apparatus or a reception apparatus according to the lexicographic order determination.

Figure 9:
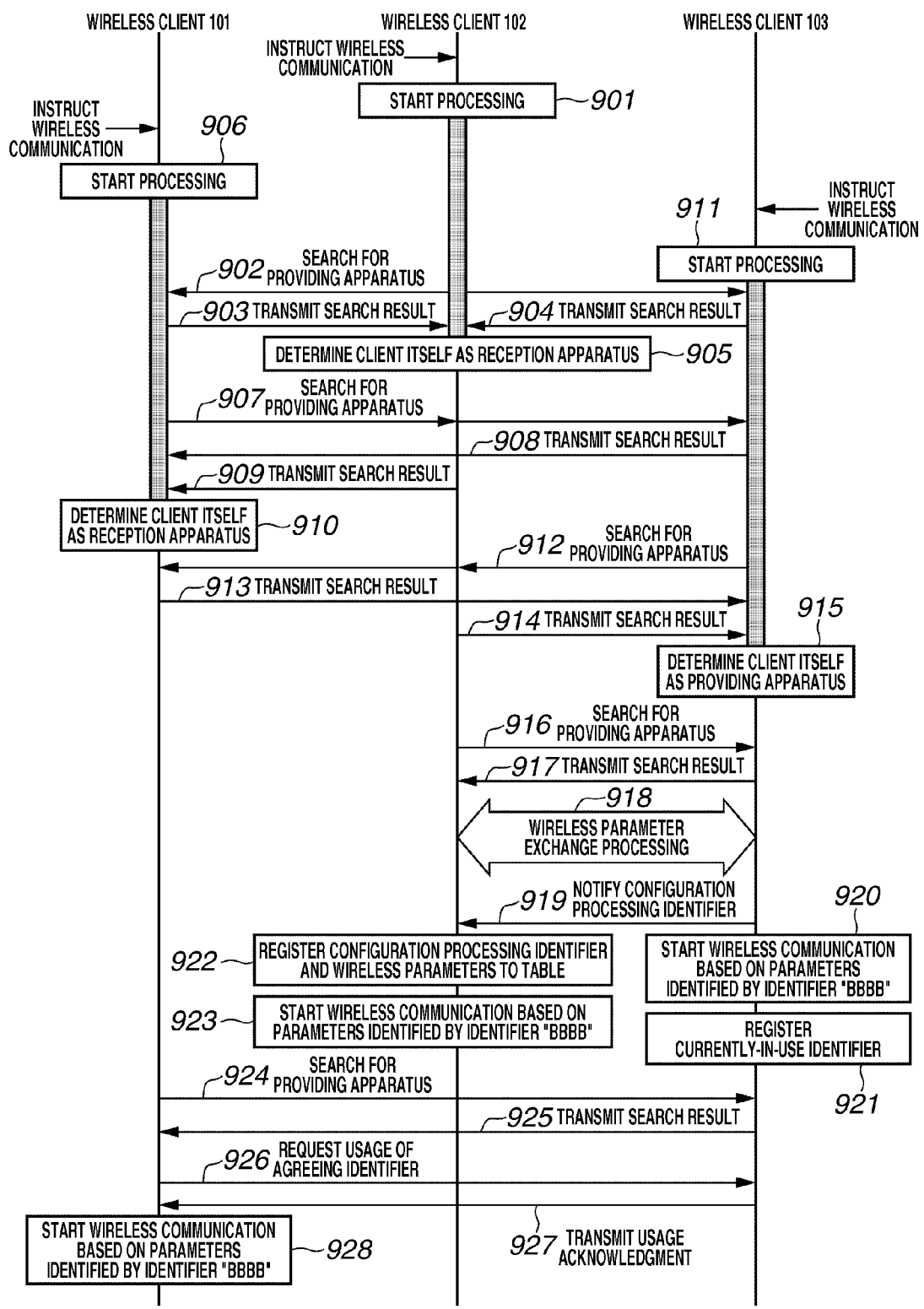
FIG. 9 illustrates an example sequence of automatic wireless parameter configuration processing according to a third exemplary embodiment of the present invention.

FIG. 9 illustrates an example sequence of the automatic wireless parameter configuration processing performed among the wireless communication apparatus 101, the wireless communication apparatus 102, and the wireless communication apparatus 103.

The wireless communication apparatus 101 and the wireless communication apparatus 103 store beforehand common wireless parameters which are identified by the configuration processing identifier BBBB. The wireless communication apparatus 102 does not store any configuration processing identifier identical to the identifier(s) of the wireless communication apparatus 101 or the wireless communication apparatus 103.

First, if a user of the wireless communication apparatus 102 instructs via the user interface unit to start wireless communication 208, the wireless communication apparatus 102 starts automatic wireless parameter configuration processing (901).

After starting the automatic wireless parameter configuration processing, the wireless communication apparatus 102 activates its timer T and transmits a search (scan) request for determining whether any providing apparatus is present in an enabled communication area (902). The wireless communication apparatus 102 periodically transmits the search request until expiration of timer T.

Furthermore, if a user of the wireless communication apparatus 101 (or the wireless communication apparatus 103) instructs via the user interface unit 208 to start wireless communication, the wireless communication apparatus 101 (or the wireless communication apparatus 103) starts automatic wireless parameter configuration processing (906, 911).

Similar to the wireless communication apparatus 102, the wireless communication apparatus 101 (or the wireless communication apparatus 103) activates its timer T and periodically transmits a search request until expiration of timer T (907, 912).

In response to the search request (902) received from the wireless communication apparatus 102, the wireless communication apparatus 101 (or 103) returns a search response including configuration processing identifier(s) stored in each communication apparatus as well as information indicating whether the communication apparatus itself is a providing apparatus (903, 904). In this embodiment, both the wireless communication apparatuses 101 and 103 have not yet determined their roles. Therefore, the search response includes a flag being set to 0 that indicates the incapability of providing wireless parameters.

Upon expiration of timer T, the wireless communication apparatus 102 performs the above role determination processing described with reference to the flowchart illustrated in FIG. 10.

First, the wireless communication apparatus 102 refers to the search responses (903, 904) returned from the wireless communication apparatuses 101 and 103 and confirms that there is not any providing apparatus in the enabled communication area (NO in step S1001).

Next, the wireless communication apparatus 102 calculates a number of agreeing apparatuses of the communication apparatus itself and numbers of agreeing apparatuses of the wireless communication apparatuses 101 and 103 (steps S1003 and S1004). In this embodiment, the wireless communication apparatus 102 does not store any configuration processing identifier identical to those stored in the wireless communication apparatuses 101 and 103. Therefore, the number of agreeing apparatuses of the communication apparatus itself is 0. On the other hand, the wireless communication apparatuses 101 and 103 store the same configuration processing identifier BBBB. Therefore, the numbers of agreeing apparatuses of the wireless communication apparatuses 101 and 103 are 1.

Then, the wireless communication apparatus 102 determines its role as a reception apparatus based on the result of calculated numbers of agreeing apparatuses (905, YES in step S1005, NO in step S1006, step S1002).

The wireless communication apparatuses 103 and 102, which have received the search request (907) from the wireless communication apparatus 101, transmit search responses including configuration processing identifier(s) stored in them together with the information indicating whether the communication apparatus itself is a providing apparatus (908, 909). In this embodiment, the role of the wireless communication apparatus 103 is not determined yet and the role of the wireless communication apparatus 102 is determined as a reception apparatus. Therefore, the search response includes a flag set to 0 that indicates the incapability of providing wireless parameters.

Upon expiration of timer T, the wireless communication apparatus 101 performs the above role determination processing described with reference to the flowchart illustrated in FIG. 10.

First, the wireless communication apparatus 101 refers to the search responses (907, 908) returned from the wireless communication apparatuses 103 and 102 and confirms that there is not any providing apparatus in the enabled communication area (NO in step S1001).

Next, the wireless communication apparatus 101 calculates a number of agreeing apparatuses of the communication apparatus itself as well as numbers of agreeing apparatus of the wireless communication apparatuses 102 and 103 (steps S1003 and S1004). As described above, the number of agreeing apparatuses of the wireless communication apparatus 101 is 1, the number of agreeing apparatuses of the wireless communication apparatus 102 is 0, and the number of agreeing apparatuses of the wireless communication apparatus 103 is 1.

Thus, based on the result of calculated numbers of agreeing apparatuses, the wireless communication apparatus 101 determines that the numbers of agreeing apparatuses of the communication apparatus itself and the wireless communication apparatus 103 are both largest (NO in step S1005, YES in step S1008, and YES in step S1009). Then, the wireless communication apparatus 101 performs lexicographic order determination based on the device identification information of the communication apparatus itself and the device identification information of the wireless communication apparatus 103 (step S1010). It is assumed that the wireless communication apparatus 103 becomes a winner and the wireless communication apparatus 101 becomes a loser in the lexicographic order determination (NO in step S1010). As a result, the wireless communication apparatus 101 determines its role as a reception apparatus (910; step S1002).

The wireless communication apparatuses 101 and 102, which have received the search request (912) from the wireless communication apparatus 103, transmit search responses including configuration processing identifier(s) stored in them together with the information indicating whether the communication apparatus itself is a providing apparatus (913, 914). In this embodiment, the roles of the wireless communication apparatuses 101 and 102 are determined as reception apparatuses. Therefore, the search response includes a flag set to 0 that indicates the incapability of providing wireless parameters.

Upon expiration of timer T, the wireless communication apparatus 103 performs the above role determination processing described with reference to FIG. 10.

First, the wireless communication apparatus 103 refers to the search responses (913, 914) returned from the wireless communication apparatuses 101 and 102 and confirms that there is not any providing apparatus in the enabled communication area (NO in step S1001).

Next, the wireless communication apparatus 103 calculates a number of agreeing apparatuses of the communication apparatus itself and numbers of agreeing apparatuses of the wireless communication apparatuses 101 and 102 (steps S1003 and S1004). In this embodiment, as described above, the number of agreeing apparatuses of the wireless communication apparatus 101 is 1, the number of agreeing apparatuses of the wireless communication apparatus 102 is 0, and the number of agreeing apparatuses of the wireless communication apparatus 103 is 1.

Thus, based on the result of calculated numbers of agreeing apparatuses, the wireless communication apparatus 103 determines that both the numbers of agreeing apparatuses of the communication apparatus itself and the wireless communication apparatus 101 are largest (NO in step S1005, YES in step S1008, and YES in step S1009). Then, the wireless communication apparatus 103 performs the lexicographic order determination based on the device identification information of the communication apparatus itself and the device identification information of the wireless communication apparatus 101 (step S1010). As described above, the wireless communication apparatus 103 becomes a winner in the lexicographic order determination (YES in step S1010), the wireless communication apparatus 103 determines its role as a providing apparatus (915; step S1007).

The wireless communication apparatus 102, after determining its role as a reception apparatus (905), performs the processing described with reference to FIG. 4. At this moment, this embodiment differs from the first exemplary embodiment in that the wireless communication apparatus 102 has not yet detected any providing apparatus. Accordingly, the wireless communication apparatus 102 performs scan processing for detecting a providing apparatus and acquires configuration processing identifier(s) from the detected providing apparatus (916; step S401).

If the wireless communication apparatus 103 receives a search request after determining its role as a providing apparatus, the wireless communication apparatus 103 performs the above-described processing illustrated in FIG. 5.

The automatic wireless parameter configuration processing is not yet performed between the wireless communication apparatus 103 and other wireless communication apparatus. Therefore, the value of the currently-in-use identifier acquired from the RAM 203 is identical to the initial value (YES in steps S501 and S502). Accordingly, the wireless communication apparatus 103 transmits a search response including all configuration processing identifiers stored in its configuration processing identifier table to the wireless communication apparatus 101 (917; step S504). As the wireless communication apparatus 103 operates as a providing apparatus, the search response includes a flag set to 1 that indicates the capability of providing wireless parameters.

The wireless communication apparatus 102 compares the configuration processing identifier(s) included in the search response received from the wireless communication apparatus 103 with the configuration processing identifier(s) stored in its configuration processing identifier table (step S402). In this embodiment, there is not any agreeing configuration processing identifier. Therefore, the wireless communication apparatus 102 and the wireless communication apparatus 103 perform wireless parameter exchange processing (918; step S404). Through the wireless parameter exchange processing, wireless parameters defined by the configuration processing identifier BBBB are transmitted from the wireless communication apparatus 103 to the wireless communication apparatus 102.

The wireless communication apparatus 103, after completing transmission of the wireless parameters to the wireless communication apparatus 102, notifies the wireless communication apparatus 102 of the configuration processing identifier BBBB (919). Then, the wireless communication apparatus 103 configures wireless parameters identified by the configuration processing identifier BBBB and starts wireless communication based on the configured wireless parameters (920). Furthermore, the wireless communication apparatus 103 registers the configuration processing identifier BBBB allocated to the wireless parameters used in the current wireless communication as a currently-in-use identifier into the RAM 203 (921).

The wireless communication apparatus 102 registers the configuration processing identifier BBBB and the wireless parameters transmitted from the wireless communication apparatus 103 into the configuration processing identifier table while associating them with each other (922). Then, the wireless communication apparatus 102 starts wireless communication based on the registered wireless parameters (923). In this manner, the wireless communication apparatuses 102 and 103 can accomplish the configuration of common wireless parameters.

The wireless communication apparatus 101, after determining its role as a reception apparatus (910), performs the processing described with reference to FIG. 4. At this moment, the wireless communication apparatus 101 has not yet detected any providing apparatus. Accordingly, the wireless communication apparatus 101 performs scan processing for detecting a providing apparatus and acquires configuration processing identifier(s) from the detected providing apparatus (924; step S401).

If the wireless communication apparatus 103 receives a search request after determining its role as a providing apparatus, the wireless communication apparatus 103 performs the above-described processing illustrated in FIG. 5.

In this embodiment, the wireless communication apparatus 103 and the wireless communication apparatus 102 have already performed the wireless parameter configuration processing. The currently-in-use identifier acquired from the RAM 203 is BBBB (step S501). Therefore, the currently-in-use identifier is different from the initial value (NO in step S502). The wireless communication apparatus 103 transmits a search response including the currently-in-use identifier BBBB to the wireless communication apparatus 101 (925; step S503).

The wireless communication apparatus 101 compares the configuration processing identifier(s) included in the search response received from the wireless communication apparatus 103 with configuration processing identifiers stored in its configuration processing identifier table (step S402). In this case, both the wireless communication apparatus 101 and the wireless communication apparatus 103 store the same configuration processing identifier BBBB in their tables. Therefore, the wireless communication apparatus 101 transmits a message requesting wireless communication performed based on wireless parameters identified by the configuration processing identifier BBBB to the wireless communication apparatus 103 (926; step S403).

In response to the request message received from the wireless communication apparatus 101, the wireless communication apparatus 103 transmits an acknowledgment to the wireless communication apparatus 101 (927). Then, the wireless communication apparatus 101 configures wireless parameters identified by the configuration processing identifier BBBB and starts wireless communication based on the configured wireless parameters (928).

Through the above-described procedure, the wireless communication apparatuses 101, 102, and 103 can accomplish the automatic wireless parameter configuration processing.

As described above, an exemplary embodiment enables each wireless communication apparatus to determine whether the communication apparatus itself can operate as a providing apparatus or a reception apparatus based on configuration processing identifier(s) acquired from other wireless communication apparatus. As a result, an exemplary embodiment can prevent each wireless communication apparatus from performing unnecessary wireless parameter exchange processing. The system as a whole can reduce the time required for the automatic wireless parameter configuration processing and can improve the usability.

The IEEE 802.11 wireless LAN can be replaced with any other wireless medium such as wireless USB, Bluetooth®, or Ultra Wide Band (UWB) and also can be replaced with any other wired communication medium such as wired LAN.

As described above, a communication apparatus according to an exemplary embodiment stores communication parameters together with configuration processing identifier(s) allocated to these parameters and acquires configuration processing identifier(s) from other communication apparatus. The communication apparatus determines whether to use the stored communication parameters or receive communication parameters from other communication apparatus based on a comparison between the stored configuration processing identifier(s) and the acquired configuration processing identifier(s). Thus, the communication apparatus does not receive any unnecessary parameters and can reduce the time required for the configuration of communication parameters.

Furthermore, the communication apparatus according to an exemplary embodiment searches for a providing apparatus that can provide communication parameters and acquires configuration processing identifier(s) from a detected providing apparatus. Thus, the communication apparatus can determine whether to receive communication parameters from the providing apparatus.

Furthermore, the communication apparatus determines its role in the communication parameter configuration processing and, if communication apparatus determines to serve as a reception apparatus, acquires configuration processing identifier(s) allocated to communication parameters. Thus, the reception apparatus can determine whether to receive communication parameters.

Furthermore, if the communication apparatus detects any providing apparatus existing in its enabled communication area, the communication apparatus determines its role as a reception apparatus. On the other hand, if there is not any providing apparatus in the enabled communication area, the communication apparatus determines its role as a providing apparatus. Thus, the communication apparatus can determine whether to operate as a providing apparatus or a reception apparatus according to surrounding conditions.

Moreover, the communication apparatus determines its role with reference to the stored configuration processing identifier(s) and the configuration processing identifier(s) acquired from other communication apparatus. Thus, the communication apparatus can determine whether to operate as a providing apparatus or a reception apparatus.

Furthermore, a first communication apparatus stores communication parameters together with a configuration processing identifier allocated to these parameters and transmits a stored configuration processing identifier in response to a request received from a second communication apparatus. If there are any common communication parameters configured for communication between the first communication apparatus and a third communication apparatus, the first communication apparatus transmits a configuration processing identifier allocated to the communication parameters having been configured. If there are not any common communication parameters configured for communication between the first communication apparatus and the third communication apparatus, the first communication apparatus transmits all of the stored configuration processing identifiers. Thus, the first communication apparatus, the second communication apparatus, and the third communication apparatus can configure common communication parameters.

Moreover, the communication apparatus according to an exemplary embodiment supplies communication parameters to other communication apparatus and, if a predetermined notification condition is satisfied, notifies the other communication apparatus of a configuration processing identifier allocated to the supplied communication parameters. The notification condition is, for example, whether device information of the other communication apparatus agrees with predetermined information, whether the communication parameters supplied to the other communication apparatus have a security level higher than a predetermined security level, or whether an item selected by a user via a user interface agrees with a predetermined item.

Thus, an exemplary embodiment can prevent a configuration processing identifier allocated to communication parameters, if reuse of these parameters is undesired, from being commonly used in a communication between the communication apparatus and other communication apparatus. As a result, an exemplary embodiment can enhance the security of a communication apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-145452 filed May 31, 2007, which is hereby incorporated by reference herein in its entirety.

What is claimed is:

1. A communication apparatus, comprising:
   a storage unit configured to store one or more sets of communication parameters, which comprises at least one of authentication method, encryption method and encryption key, and one or more configuration processing identifiers for identifying each of the one or more sets of communication parameters;
   an acquisition unit configured to acquire one or more configuration processing identifiers which identifies each of the one or more sets of communication parameters stored in another apparatus, from the another communication apparatus; and
   a determination unit configured to determine whether any one of the one or more configuration processing identifiers acquired by the acquisition unit agrees with any one of the one or more configuration processing identifiers stored in the storage unit; and
   a wireless communication unit configured to wirelessly communicate with the another apparatus, the wireless communication being performed by:
   1) in a case where any one of the acquired one or more configuration processing identifiers is determined to agree with any one of the one or more configuration processing identifiers stored in the storage unit, designating the agreed configuration processing identifier to the another apparatus and using the set of communication parameters corresponding to the agreed configuration processing identifier, and
   2) in a case where the acquired one or more configuration processing identifiers are determined not to agree with the one or more configuration processing identifiers stored in the storage unit, acquiring a set of communication parameters from the another apparatus and using the acquired set of the communication parameters.

2. The communication apparatus according to claim 1, wherein
the wireless communication unit performs wireless communication with the another communication apparatus in an ad hoc mode.

3. The communication apparatus according to claim 1, further comprising a search unit configured to search a providing apparatus that provides communication parameters, wherein the acquisition unit acquires the one or more configuration processing identifiers from the providing apparatus detected by the search unit.

4. The communication apparatus according to claim 1, further comprising a role determination unit configured to determine a role relating to communication parameter configuration processing, wherein the acquisition unit executes acquisition of any configuration processing identifier if the role determination unit determines the role of the communication apparatus as a reception apparatus that receives communication parameters.

5. The communication apparatus according to claim 1, further comprising a role determination unit configured to determine a role relating to communication parameter configuration processing, wherein the role determination unit determines the role of the communication apparatus based on the number of configuration processing identifiers agreeing with the one or more configuration processing identifiers of each of the other.

6. The communication apparatus according to claim 1, further comprising:
a role determination unit configured to determine a role relating to communication parameter configuration processing; and
a notification unit configured to notify the another communication apparatus of a configuration processing identifier, if the role determination unit determines the role of the communication apparatus as a providing apparatus that provides the set of communication parameters, wherein the notification unit notifies the other communication apparatus if a predetermined notification condition is satisfied.

7. A communication apparatus comprising:
a storage unit configured to store communication parameters and a configuration processing identifier allocated to the communication parameters;
an acquisition unit configured to acquire a configuration processing identifier from another communication apparatus;
a determination unit configured to determine whether to use the communication parameters stored in the storage unit or acquire communication parameters from the another communication apparatus, based on the configuration processing identifier stored in the storage unit and the configuration processing identifier acquired by the acquisition unit; and
a role determination unit configured to determine a role relating to communication parameter configuration processing, wherein the role determination unit determines the role of the communication apparatus as a reception apparatus that receives communication parameters if there is any providing apparatus existing in an enabled communication area and as a providing apparatus that provides communication parameters if there is not any other providing apparatus existing in the enabled communication area.

8. A first communication apparatus comprising:
a storage unit configured to store communication parameters and a configuration processing identifier allocated to the communication parameters; and
a transmission unit configured to transmit a configuration processing identifier stored in the storage unit in response to a request received from a second communication apparatus,
wherein if common communication parameters are configured for communication between the first communication apparatus and a third communication apparatus, the transmission unit transmits a configuration processing identifier allocated to the communication parameters having been configured, and
if common communication parameters are not configured for communication between the first communication apparatus and the third communication apparatus, the transmission unit transmits all of the configuration processing identifiers stored in the storage unit.

9. A communication apparatus comprising:
a providing unit configured to provide communication parameters to another communication apparatus; and
a notification unit configured to notify the another communication apparatus of a configuration processing identifier allocated to the provided communication parameters if a predetermined notification condition is satisfied, wherein the predetermined notification condition includes at least one of the following conditions:
whether device information of the another communication apparatus agrees with predetermined information;
whether the communication parameters supplied to the another communication apparatus have a security level higher than a predetermined security level; and
whether an item selected by a user via a user interface agrees with a predetermined item.

10. A method for controlling a communication apparatus that stores one or more sets of communication parameters, which comprises at least one of authentication method, encryption method and encryption key, and one or more configuration processing identifiers for identifying each of the one or more sets of communication parameters, the method comprising: and
acquiring one or more configuration processing identifiers, which identifies each of the one or more sets of communication parameters stored in another apparatus, from the another communication apparatus;
determining whether any one of the acquired one or more configuration processing identifiers agrees with any one of the stored one or more configuration processing identifiers;
wirelessly communicating with the another communication apparatus, the wireless communicating being performed by:
1) in a case where any one of the acquired one or more configuration processing identifiers is determined to agree with any one of the stored one or more configuration processing identifiers, designating the agreed configuration processing identifier to the another apparatus and using the set of communication parameters corresponding to the agreed configuration processing identifier, and
2) in a case where the acquired one or more configuration processing identifiers are determined not to agree with the stored one or more configuration processing identifiers, acquiring a set of communication parameters from the another apparatus and using the acquired set of the communication parameters.

11. The method according to claim 10, further comprising: performing wireless communication with the another communication apparatus in an ad hoc mode.

12. The method according to claim 10, further comprising: determining a role relating to communication parameter configuration processing by a role determination unit ; and notifying the another communication apparatus of a configuration processing identifier by a notification unit, if the role determination unit determines the role of the communication apparatus as a providing apparatus that provides the set of communication parameters, wherein the notification unit notifies the other communication apparatus.

13. A method for controlling a first communication apparatus that store communication parameters and a configuration processing identifier allocated to the communication parameters, the method comprising:

transmitting a stored configuration processing identifier in response to a request received from a second communication apparatus, wherein if common communication parameters are configured for communication between the first communication apparatus and a third communication apparatus, transmitting a configuration processing identifier allocated to the communication parameters having been configured, and if common communication parameters are not configured for communication between the first communication apparatus and the third communication apparatus, transmitting all of the stored configuration processing identifiers.

14. A non-transitory computer-readable storage medium storing a computer program for controlling a communication apparatus that stores one or more sets of communication parameters, which comprises at least one of authentication method, encryption method and encryption key, and one or more configuration processing identifiers for identifying each of the one or more sets of communication parameters, the storage medium storing:

computer-executable instructions for acquiring one or more configuration processing identifiers, which identifies each of the one or more sets of communication parameters stored in another apparatus, from the another communication apparatus; and computer-executable instructions for determining whether any one of the acquired one or more configuration agrees with any one of the stored one or more configuration processing identifiers; and wirelessly communicating with the another communication apparatus, the wireless communicating being performed by:

1) in a case where any one of the acquired one or more configuration processing identifiers is determined to agree with any one of the stored one or more configuration processing identifiers, designating the agreed configuration processing identifier to the another apparatus and using the set of communication parameters corresponding to the agreed configuration processing identifier, and 2) in a case where the acquired one or more configuration processing identifiers are determined not to agree with the stored one or more configuration processing identifiers, acquiring a set of communication parameters from the another apparatus and using the acquired set of the communication parameters.

15. The non-transitory computer-readable storage medium according to claim 14, further comprising:

computer-executable instructions for determining a role relating to communication parameter configuration processing; and computer-executable instructions for notifying the another communication apparatus of a configuration processing identifier, if it is determined that the role of the communication apparatus as a providing apparatus that provides the set of communication parameters, wherein the notifying notifies the other communication apparatus.

16. A non-transitory computer-readable storage medium storing a computer program for controlling a first communication apparatus that stores communication parameters and a configuration processing identifier allocated to the communication parameters, the storage medium storing:

computer-executable instructions for transmitting a stored configuration processing identifier in response to a request received from a second communication apparatus;

if common communication parameters are configured for communication between the first communication apparatus and a third communication apparatus, computer-executable instructions for transmitting a configuration processing identifier allocated to the communication parameters having been configured; and if common communication parameters are not configured for communication between the first communication apparatus and the third communication apparatus, computer-executable instructions for transmitting all of the stored configuration processing identifiers.

* * * * *